United States Patent
Iwakura et al.

(10) Patent No.: US 9,381,510 B2
(45) Date of Patent: Jul. 5, 2016

(54) EXHAUST GAS PURIFYING CATALYST COMPRISING A CATALYST LAYER COMPRISING AT LEAST TWO INORGANIC POROUS PARTICLES

(71) Applicant: Mitsui Mining & Smelting Co., Ltd., Tokyo (JP)

(72) Inventors: Hironori Iwakura, Saitama (JP); Toshiharu Moriya, Saitama (JP); Yasunori Imada, Saitama (JP); Yunosuke Nakahara, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 14/440,474

(22) PCT Filed: Sep. 10, 2014

(86) PCT No.: PCT/JP2014/073917
§ 371 (c)(1),
(2) Date: May 4, 2015

(87) PCT Pub. No.: WO2015/037613
PCT Pub. Date: Mar. 19, 2015

(65) Prior Publication Data
US 2015/0273462 A1  Oct. 1, 2015

(30) Foreign Application Priority Data

Sep. 11, 2013 (JP) ................................. 2013-188137

(51) Int. Cl.
*B01J 21/00* (2006.01)
*B01J 21/12* (2006.01)
(Continued)

(52) U.S. Cl.
CPC .................. *B01J 35/10* (2013.01); *B01D 53/94* (2013.01); *B01D 53/945* (2013.01); *B01J 23/63* (2013.01);
(Continued)

(58) Field of Classification Search
CPC ............... B01D 2255/9205; B01D 2255/9207; B01J 21/00; B01J 21/04; B01J 21/08; B01J 23/03; B01J 23/002; B01J 35/023; B01J 35/10; B01J 35/1061; B01J 35/1066; B01J 35/1076; Y10T 428/24372; Y10T 428/24413; Y10T 428/24421; Y10T 428/24942; Y10T 428/249981
USPC ........... 428/212, 316.6, 317.9, 143, 148, 149; 502/104, 113; 55/523
See application file for complete search history.

(56) References Cited

U.S. PATENT DOCUMENTS 5,491,120 A * 2/1996 Voss ...................... B01D 53/864
423/215.5
6,511,642 B1 * 1/2003 Hatanaka ............... B01D 53/02
423/239.1
(Continued)

FOREIGN PATENT DOCUMENTS

EP  736503 A1  10/1996
JP  8332329 A2  12/1996
(Continued)

OTHER PUBLICATIONS

Redrawing the Map on Redistricting: A National Study, Azavea, Inc., 2010, [online], retrieval date: Dec. 1, 2014, <URL>http://cdn.azavea.com/com.redistrictingthenation/pdfs/Redistricting The Nation White Paper 2010.pdf.
(Continued)

*Primary Examiner* — Holly Le
(74) *Attorney, Agent, or Firm* — Rankin, Hill & Clark LLP

(57) ABSTRACT

An exhaust gas purifying catalyst comprising a catalyst layer comprising two or more types of inorganic porous particles each having a different particle size, a catalytically active component, and voids, wherein; as a first characteristic, 50% or more by number of all the voids in the catalyst layer satisfies a condition of the following (formula 1); $L/2/(\pi S)^{1/2} \geq 2$ . . . (formula 1) wherein S represents a void cross-sectional area, and L represents a void cross-sectional circumference in the (formula 1), and; as a second characteristic, in the void cross-sectional area in the catalyst layer, the average void radius, determined assuming that the void shape is a perfect circle, is 10 μm to 20 μm.

2 Claims, 1 Drawing Sheet

(51) Int. Cl.
*B01J 35/10* (2006.01)
*B01J 35/02* (2006.01)
*B01J 23/63* (2006.01)
*B01D 53/94* (2006.01)
*B01J 35/00* (2006.01)

(52) U.S. Cl.
CPC ............ *B01J 35/0006* (2013.01); *B01J 35/023* (2013.01); *B01J 35/1076* (2013.01); *B01D 2255/1023* (2013.01); *B01D 2255/2063* (2013.01); *B01D 2255/2065* (2013.01); *B01D 2255/2092* (2013.01); *B01D 2255/20715* (2013.01); *B01D 2255/9202* (2013.01); *B01D 2255/9205* (2013.01); *Y02T 10/22* (2013.01); *Y10T 428/24372* (2015.01); *Y10T 428/249981* (2015.04); *Y10T 428/2982* (2015.01)

(56) References Cited

U.S. PATENT DOCUMENTS

| | | | |
|---|---|---|---|
| 2003/0093982 A1* | 5/2003 | Suwabe | B01D 46/2459 55/523 |
| 2004/0161596 A1* | 8/2004 | Taoka | B01D 46/2429 428/304.4 |
| 2005/0207946 A1* | 9/2005 | Asano | B01D 46/0001 422/177 |
| 2009/0173065 A1 | 7/2009 | Cho | |
| 2009/0286677 A1* | 11/2009 | Takeshima | B01D 53/945 502/241 |
| 2012/0129690 A1* | 5/2012 | Larcher | B01J 21/12 502/304 |
| 2012/0251768 A1 | 10/2012 | Suenobu | |
| 2013/0345049 A1* | 12/2013 | Chinzei | B01D 53/945 502/303 |
| 2014/0338296 A1* | 11/2014 | Backhaus-Ricoult | B01D 46/2429 55/523 |
| 2014/0370233 A1* | 12/2014 | Izumi | B01D 39/20 428/116 |
| 2015/0111727 A1* | 4/2015 | Nagashima | B01J 23/63 502/303 |
| 2015/0266004 A1* | 9/2015 | Kumatani | B01J 21/066 502/304 |

FOREIGN PATENT DOCUMENTS

| | | |
|---|---|---|
| JP | 2002191988 A2 | 7/2002 |
| JP | 2002253968 A2 | 9/2002 |
| JP | 2004025013 A2 | 1/2004 |
| JP | 2005349293 A2 | 12/2005 |
| JP | 2006110485 A2 | 4/2006 |
| JP | 200721368 | 2/2007 |
| JP | 2007275704 A2 | 10/2007 |
| JP | 2012206057 A2 | 10/2012 |
| JP | 2012240027 A2 | 12/2012 |

OTHER PUBLICATIONS

International Search Report dated Dec. 16, 2014 filed in PCT/JP2014/073917.

* cited by examiner

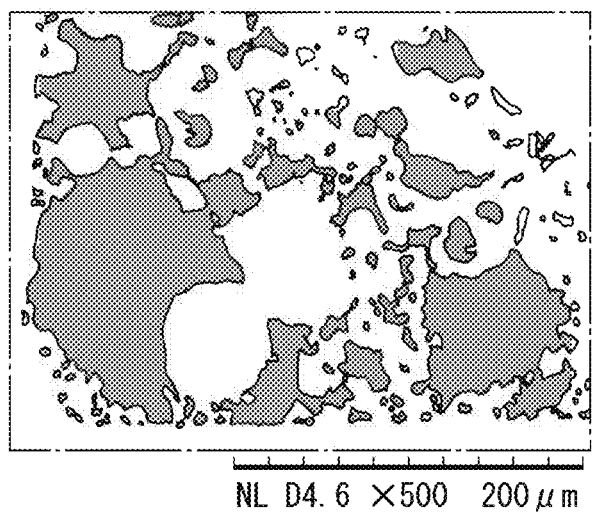

EXHAUST GAS PURIFYING CATALYST COMPRISING A CATALYST LAYER COMPRISING AT LEAST TWO INORGANIC POROUS PARTICLES

TECHNICAL FIELD

The present invention relates to an exhaust gas purifying catalyst which can be used to purify exhaust gas discharged from an internal-combustion engine of a two-wheeled or four-wheeled motor vehicle and the like.

BACKGROUND ART

Since harmful components such as hydrocarbon (THC), carbon monoxide (CO), and nitrogen oxide (NOx) are contained in exhaust gas of an internal-combustion engine of a motor vehicle or the like which uses gasoline as a fuel, it is necessary to simultaneously purify each harmful component using an oxidation-reduction reaction and exhaust the resulting constituent. For example, it is necessary to purify hydrocarbon (THC) by oxidizing the hydrocarbon (THC) to convert it to water and carbon dioxide, to purify carbon monoxide (CO) by oxidizing the carbon monoxide (CO) to convert it to carbon dioxide, and to purify nitrogen oxide (NOx) by reducing the nitrogen oxide (NOx) to convert it to nitrogen.

As a catalyst for treating exhaust gas from such an internal-combustion engine (hereinafter referred to as an "exhaust gas purifying catalyst"), three-way catalysts (TWC) which can redox CO, THC, and NOx are used.

Examples of such three-way catalysts which are known include a structure prepared by supporting a precious metal on refractory oxide porous particles such as alumina porous particles which have a high surface area and coating, with the precious metal-supporting porous particles, a base material, for example, a monolith-type base material made of a refractory ceramic or a metal honeycomb structure to form a catalyst layer.

However, the bonding strength between a precious metal as a catalytically active component and a base material is not so strong, and the specific surface area of the base material itself is not so large. Therefore, even if it is intended to allow a base material to directly support a precious metal, it is difficult to support a sufficient amount of precious metal in a highly dispersed state. Therefore, in order to allow a sufficient amount of catalytically active component to be supported in a highly dispersed state on the surface of a base material, a precious metal has been supported by a particulate catalyst carrier having high specific surface area.

Examples of this type of catalyst carrier which is known include porous particles made of a refractory inorganic oxide such as a silica, alumina, and titania compounds. Among them, activated alumina made of a mixture of gamma phase alumina and delta phase alumina has a particularly high surface area and is an excellent material as a catalyst carrier.

Incidentally, since exhaust gas of motor vehicles or the like has a high gas flow rate, the exhaust gas has posed a problem that the exhaust gas is hardly diffused to a deep part of a catalyst layer, preventing sufficient catalyst performance from being exhibited. Therefore, in order to increase gas diffusibility to improve purifying performance, the following proposals have been made in which voids are formed in a catalyst layer.

For example, Patent Literature 1 (Japanese Patent Laid-Open No. 2002-191988) and Patent Literature 2 (Japanese Patent Laid-Open No. 2002-253968) propose a NOx storage reduction type catalyst in which a precious metal and a NOx storing agent are supported by a coating layer made of a porous structure provided with pores each having a specific pore size to thereby increase the gas diffusibility of exhaust gas to improve the purification efficiency of NOx.

Patent Literature 3 (Japanese Patent Laid-Open No. 2004-025013) discloses an exhaust gas purifying catalyst comprising a honeycomb-shaped base material and a catalyst coating layer formed on the surface of the base material, in which the catalyst coating layer contains at least a powder of an oxygen storage release material, has pores each having a central pore size of 0.1 μm or more, wherein the pore volume of the pores in the range of a central pore size of ±50% is 0.05 cc/g or more.

Patent Literature 4 (Japanese Patent Laid-Open No. 2006-110485) discloses, as an exhaust gas catalyst to increase the gas diffusibility of exhaust gas in a catalyst layer to thereby improve catalyst efficiency, an exhaust gas purifying catalyst comprising at least a carrier and a plurality of layers formed on the carrier, wherein at least one layer in the plurality of layers contains a catalytic component; the layer has voids; and the voids have an average diameter of 0.2 to 500 μm.

Further, as a method for forming large voids in a catalyst layer, there is disclosed a method of forming large voids by adding carbon particles, resin particles, and the like and burning out the carbon particles and resin particles caused by calcining. For example, Patent Literature 5 (Japanese Patent Laid-Open No. 2012-240027) discloses a method of creating voids each having the same shape as that of a carbon compound material by mixing catalyst particles and the carbon compound material together with a solvent to prepare a catalyst slurry and burning out the slurry in a subsequent step.

CITATION LIST

Patent Literature

Patent Literature 1:
    Japanese Patent Laid-Open No. 2002-191988
Patent Literature 2:
    Japanese Patent Laid-Open No. 2002-253968
Patent Literature 3:
    Japanese Patent Laid-Open No. 2004-025013
Patent Literature 4:
    Japanese Patent Laid-Open No. 2006-110485
Patent Literature 5:
    Japanese Patent Laid-Open No. 2012-240027

SUMMARY OF INVENTION

Technical Problem

As described above, in an exhaust gas purifying catalyst, increasing the gas diffusibility of a catalyst layer is one of the very important objects to be achieved for increasing catalyst performance. As a means for achieving the object, there is known a method of securing a gas diffusion route by mixing carbon particles, resin particles, and the like and burning out the mixture, thereby forming large voids in a catalyst layer, as disclosed, for example, in Patent Literature 5. However, according to such a method, even though large voids are created in a catalyst layer, the continuity of the voids is not sufficient, and the miscibility and diffusibility of a gas in voids is not sufficient. Thus, it has been found that gas diffusibility cannot be increased as expected.

Thus, the present invention intends to propose a new exhaust gas purifying catalyst in which the gas diffusibility and miscibility in a catalyst layer can be increased, and thereby excellent catalyst performance can be exhibited.

Solution to Problem

The present invention proposes an exhaust gas purifying catalyst comprising a catalyst layer comprising two or more types of inorganic porous particles each having a different particle size, a catalytically active component, and voids, wherein as a first characteristic, the voids satisfying a condition of the following (formula 1) occupy 50% or more by number of all the voids in the catalyst layer:

$$L/2/(\pi S)^{1/2} \geq 2 \quad \text{(formula 1)},$$

wherein S represents a void cross-sectional area, and L represents a void cross-sectional circumference; and as a second characteristic, in the void cross-sectional area in the catalyst layer, an average void radius, determined assuming that the void shape is a perfect circle, is 10 μm to 20 μm.

Advantageous Effects of Invention

The exhaust gas purifying catalyst proposed by the present invention comprises a catalyst layer comprising voids, wherein the voids satisfying a condition of the above (formula 1) occupy 50% or more by number of all the voids in the catalyst layer; and the catalyst layer comprises significantly large voids having an average void radius of 10 μm to 20 μm. Therefore, in the exhaust gas purifying catalyst, the continuity of the voids is good; the area in the voids is large; and the shape of the voids is complicated. As a result, the main flow paths of a gas are secured; the miscibility and diffusibility of the gas in the catalyst layer are improved; and thereby excellent purifying performance can be exhibited.

BRIEF DESCRIPTION OF DRAWING

FIG. 1 schematically shows an example of the shape of voids in the catalyst layer (cross section) of the exhaust gas purifying catalyst of the present invention.

DESCRIPTION OF EMBODIMENTS

Next, the present invention will be described based on an example of embodiments. However, the present invention is not limited to the embodiments to be described below.
<The Present Catalyst>
The exhaust gas purifying catalyst (hereinafter referred to as "the present catalyst") as an example of the embodiments of the present invention is an exhaust gas purifying catalyst comprising a catalyst layer (referred to as "the present catalyst layer") and a base material, the catalyst layer comprising two or more types of inorganic porous particles each having a different particle size, a catalytically active component, and voids.

Since the present catalyst is satisfactory as long as it comprises the present catalyst layer, the present catalyst may have, for example, a structure in which the present catalyst layer is formed on the surface of the base material, a structure in which the present catalyst layer is formed on the surface of the base material through other layers, or a structure in which the present catalyst layer is formed in a spot which is not the surface side of the base material.
<Catalyst Layer>
The present catalyst may comprise a catalyst layer consisting of one layer or a catalyst layer consisting of two or more catalyst layers.

Note that the "catalyst layer" as used in the present invention means a layer having a gas adsorption action or a gas purifying catalyst action. When a layer contains a catalytically active component, the layer corresponds to the "catalyst layer" because the layer has a gas purifying catalyst action, but the "catalyst layer" may not necessarily contain a catalytically active component.

When the present catalyst comprises two or more catalyst layers, at least one of the catalyst layers may be the present catalyst layer. At this time, the present catalyst layer may be one layer or two or more layers, or one or two or more other layers may be laminated in the vertical direction. At this time, a layer which is not a catalyst layer such as a layer made of a porous refractory inorganic oxide powder and a layer made of a porous refractory inorganic oxide powder and a promoter component may be present between the catalyst layers.

Further, the present catalyst may comprise other catalyst layers different from the present catalyst layer in the flow direction of exhaust gas.
<The Present Catalyst Layer>
The present catalyst layer is a porous layer comprising two or more types of inorganic porous particles each having a different particle size, a catalytically active component, and optionally other components, and having a large number of communicating voids.
(Void Shape and Size)
The present catalyst layer comprises voids, wherein the voids satisfying a condition of the following (formula 1) occupy 50% or more by number of all the voids in the catalyst layer; and in the void cross-sectional area in the catalyst layer, an average void radius, determined assuming that the void shape is a perfect circle, is 10 μm to 20 μm.

$$L/2/(\pi S)^{1/2} \geq 2 \quad \text{(formula 1)}$$

In the above relational expression (1), "S" represents a void cross-sectional area, and "L" represents a void cross-sectional circumference, and both of them can be measured by observing the cross section of the catalyst layer with an electron microscope and analyzing the electron microscope image using image analysis software.

FIG. 1 schematically shows an example of the shape of voids in the catalyst layer (cross section) of the exhaust gas purifying catalyst of the present invention. In FIG. 1, gray parts surrounded by the black line show voids, and white parts around the voids show a part comprising components forming a catalyst layer, that is, inorganic porous particles, a catalytically active component, and a binder component.

Further, when the cross-sectional area of the catalyst layer is set to 100% in the measurement, since small voids each having a void cross-sectional area of less than 0.05% hardly influence the effect, these small voids are ignored. Therefore, the above "all the voids" are directed to voids each having a void cross-sectional area of 0.05% or more relative to the cross-sectional area of the catalyst layer in the image analysis.

Furthermore, when the cross section of the catalyst layer is observed with an electron microscope, a partly chipped void may be present in an edge part of the catalyst layer. Such a partly chipped void is also included in the void specified by the present invention. Therefore, the partly chipped void is included, for example, also in the above "all the voids".

The "$L/2/(\pi S)^{1/2}$" in the above relational expression (1) shows that voids are closer to a circle or a sphere when the value of "$L/2/(\pi S)^{1/2}$" is closer to 1, and when the value of "$L/2/(\pi S)^{1/2}$" is 2 or more, the value means that voids have high noncircularity, in other words, the circumference of the voids is uneven. In this way, since a gas hitting the inner circumferential surface of voids will be diffused and mixed when the circumference of the voids is uneven, the diffusibility and miscibility of the gas in the catalyst layer can be increased.

From such a point of view, in the present catalyst layer, the voids having a value of "$L/2/(\pi S)^{1/2}$" of 2 or more preferably occupy 50% or more by number, more preferably 50% or more by number and 70% or less by number, particularly preferably 50% or more by number and 60% or less by number, of all the voids in the above relational expression (1).

On the other hand, with respect to the size of voids, in the void cross-sectional area, the average void radius, determined assuming that the void shape is a perfect circle, is preferably 10 μm to 20 μm.

At this time, since the shape of the void cross-sectional area of the present catalyst layer is indefinite, the average void radius is calculated assuming that the void shape is a perfect circle.

That fact that the average void radius in the void cross-sectional area of the present catalyst layer is 10 μm to 20 μm means that the average void size is large. When the average void radius is 10 μm or more, not only the main flow paths of a gas are secured, but also the voids serving as a branch of gas diffusion can be secured. Therefore, the diffusibility of a gas to the deep parts of the catalyst layer can be increased. Further, when the average void radius is 20 μm or less, small voids which are used as a catalytic reaction field can be secured, thereby capable of improving purifying performance.

Therefore, from such a point of view, the average void radius determined assuming that the void shape is a perfect circle is preferably 12 μm to 16 μm, particularly preferably 14 μm or more and 16 μm or less.

Examples of the methods of preparing the shape and the size of voids in the present catalyst layer in the manner as described above include a method comprising: using two types of inorganic porous particle powders in which the ratio of the average particle size is 2.0 or more to prepare a slurry; significantly increasing the viscosity of the slurry followed by coating with the resulting slurry; and quickly drying the coating. However, the method of preparing the shape and the size of voids is not limit to this method.

(Presence Ratio of Large Voids)

In the present catalyst layer, it is preferred that voids each having a cross-sectional area of $1.96 \times 10^3$ μm$^2$ or more be present in an amount of 2.0 or more per a catalyst layer cross-sectional area of $1.0 \times 10^4$ μm$^2$.

A void having a cross-sectional area of $1.96 \times 10^3$ μm$^2$ or more is a large void corresponding to a void having a cross-sectional area of 25 μm or more in radius in terms of a void in the shape of a perfect circle. When such large voids are present in an amount of 2.0 or more per a catalyst layer cross-sectional area of $1.0 \times 10^4$ μm$^2$, the large voids are communicated to each other to further expand the main flow paths of a gas, thereby capable of further increasing the diffusibility of a gas. As a result, the contactability between exhaust gas components and a catalytic component is improved to allow effective utilization of precious metals, thereby capable of further improving purification performance.

From such a point of view, the voids each having a cross-sectional area of $1.96 \times 10$ μm$^2$ or more are preferably present in an amount of 2.0 or more, more preferably 2.3 or more, particularly preferably 2.5 or more, per a catalyst layer cross-sectional area of $1.0 \times 10^4$ μm$^2$.

Examples of the methods of allowing the voids each having a cross-sectional area of $1.96 \times 10^3$ μm$^2$ or more to be present in an amount of 2.0 or more per a catalyst layer cross-sectional area of $1.0 \times 10^4$ μm$^2$ in this way include a method comprising: using two types of inorganic porous particle powders in which the ratio of the average particle size is 2.0 or more, preferably 3.5 or more, to prepare a slurry; significantly increasing the viscosity of the slurry followed by coating with the resulting slurry; and quickly drying the coating. However, the method of allowing the voids to be present as described above is not limit to this method.

(Thickness of the Present Catalyst Layer)

The present catalyst layer preferably has an average thickness of 10 μm to 500 μm, more preferably 50 μm or more and 300 μm or less, further preferably 50 μm or more and 200 μm or less, from the point of view of layer formation and peeling resistance.

(Inorganic Porous Particles)

The present catalyst layer comprises two or more types of inorganic porous particles each having a different particle size.

At this time, in order to form the voids as described above in the present catalyst layer, the average particle size of one type of inorganic porous particles is larger than the average particle size of the other type of inorganic porous particles by preferably 2 times or more, more preferably 3 times or more and 6 times or less, further preferably 4 times or more and 5 times or less.

Examples of the inorganic porous particles forming the present catalyst layer include porous particles of compounds selected from the group consisting of a silica, alumina, and titania compounds. Specific examples thereof include porous particles of compounds selected from alumina, silica, silica-alumina, alumino-silicates, alumina-zirconia, alumina-chromia, and alumina-ceria.

Examples of alumina which can be suitably used include alumina having a specific surface area of more than 50 μm$^2$/g, for example, γ-, δ-, θ-, and α-alumina. Among them, γ-, δ-, or θ-alumina is preferably used. Note that alumina may contain a very small amount of La in order to increase heat resistance.

An alumina in which the lattice of the above alumina is previously stabilized with an alkaline earth metal oxide, silicon dioxide, zirconium dioxide, or a rare earth oxide is also preferred.

Further, the inorganic porous particles may also include an OSC material, that is, a promoter (OSC material) having oxygen storage capacity (OSC).

Examples of the OSC material include a cerium compound, a zirconium compound, and a ceria-zirconia composite oxide.

Note that two or more types of inorganic porous particles each having a different particle size may be two or more types of inorganic porous particles made of the same material, or may be two or more types of inorganic porous particles made of different materials.

Among them, the particles including silica and alumina and the like are preferred as inorganic porous particles having a large particle size. Particularly, silica particles and alumina particles are preferred. The OSC material particles including ceria and zirconia are preferred as inorganic porous particles having a small particle size. Particularly, ceria particles and zirconia particles are preferred.

A preferred example includes a combination of two types of inorganic porous particles comprising an alumina particle powder having a D50 determined by a laser diffraction and scattering-type particle size distribution measuring method of 15 μm to 40 μm and a ceria-zirconia composite oxide particle powder having a D50 determined by the same method of 1 μm to 10 μm, in which the D50 of the alumina particle powder is larger than the D50 of the ceria-zirconia composite oxide particle powder by 2 times or more, particularly 3 times or more.

(Catalytic Active Component)

Examples of the catalytically active component contained in the present catalyst layer, that is, a metal having catalytic activity includes a metal such as palladium, platinum, rhodium, gold, silver, ruthenium, iridium, nickel, cerium, cobalt, copper, iron, manganese, osmium, and strontium.

Among them, platinum, rhodium, and palladium are preferably included.

The content of the catalytically active component in the present catalyst layer is preferably 0.1 to 10 μmass %, more preferably 0.1 μmass % or more and 7 μmass % or less, further preferably 0.1 μmass % or more and 5 μmass % or less, of the present catalyst layer.

(Stabilizer and Other Components)

The present catalyst layer can contain a stabilizer, a binder, and other components.

Examples of the stabilizer include an alkaline earth metal and an alkali metal. Among them, one or two or more metals selected from the group consisting of magnesium, barium, boron, thorium, hafnium, silicon, calcium, and strontium can be selected. Among them, barium is preferred from the point of view that the temperature at which PdOx is reduced is the highest, that is, barium is hardly reduced.

Further, the present catalyst layer may contain known additive components such as a binder component.

An inorganic binder, for example, a water-soluble solution such as alumina sol can be used as a binder component.

<Base Material>

Examples of the material for the base material used in the present catalyst include a refractory material such as ceramics and a metallic material.

Examples of the material of the ceramic base material include a refractory ceramic material such as cordylite, cordylite-alpha-alumina, silicon nitride, zircon-mullite, spodumene, alumina-silica magnesia, zirconium silicate, sillimanite, magnesium silicate, zircon, petalite, alpha-alumina, and aluminosilicates.

Examples of the material of the metallic base material include a refractory metal such as stainless steel and other suitable corrosion resistant alloys based on iron.

Examples of the shape of a base material include a honeycomb shape, a pellet shape, and a spherical shape.

Examples of the honeycomb material which can be used include a cordierite material such as ceramics. Further, a honeycomb made of a metallic material such as ferrite-based stainless steel can also be used.

When a honeycomb-shaped base material is used, for example, a monolith-type base material having a large number of parallel and fine gas flow paths, that is, channels in the inner part of the base material can be used so that a fluid may flow in the inner part of the base material. At this time, a catalyst layer can be formed by coating the inner wall surface of each channel of the monolith-type base material with a catalyst composition by wash coating or the like.

<Production Method>

Examples of the methods for producing the present catalyst include a method comprising: using two types of inorganic porous particle powders each having a different particle size to prepare a slurry; significantly increasing the viscosity of the slurry followed by coating with the resulting slurry; and quickly drying the coating.

At this time, in the two types of inorganic porous particle powders each having a different particle size, the ratio of the average particle size is preferably 2.0 or more, more preferably 3.5 or more, further preferably 4.0 or more. For example, it is possible to use a ceria-zirconia particle powder and an alumina particle powder having an average particle size which is larger by 2 times or more than that of the ceria-zirconia particle powder.

Specific examples of the production method include a method including: mixing and stirring two types of inorganic porous particle powders each having a different average particle size and a catalytically active component, and optionally an OSC material, a stabilizer, a binder, water, and the like to prepare a slurry; wash-coating the resulting slurry on a base material such as a ceramic honeycomb body; and calcining the coating to form the present catalyst layer on a base material surface. However, the production method is not limited to this method.

At this time, the slurry viscosity is preferably adjusted to 5,000 to 40,000 cp, more preferably 5,000 cp or more and 35,000 cp or less, further preferably 5,000 cp or more and 30,000 cp or less, from the point of view of creating noncircular and large voids.

Further, the method of quickly drying after coating with the slurry preferably includes directly applying hot air having a temperature of about 100 to 200° C. to the coating surface so that the hot air may pass through the voids, thereby quickly drying the coating while removing water.

However, all known methods can be employed as a method for producing the present catalyst, and the method for producing the present catalyst is not limited to the above example.

<Description of Words and Phrases>

When expressed as "X to Y" (X and Y are arbitrary numbers) in the present specification, this expression includes not only the meaning of "X or more and Y or less" but also the meaning of "preferably larger than X" or "preferably smaller than Y", unless otherwise specified.

Further, when expressed as "X or more" (X is an arbitrary number) or "Y or less" (Y is an arbitrary number), the expression includes the intention to mean "preferably larger than X" or "preferably less than Y", respectively.

EXAMPLES

Hereinafter, the present invention will be further described in detail based on examples and comparative examples.

Example 1

Ceria-zirconia powder (D50: 7.9 μm, represented by "OSC" in the table) and La-added alumina powder (D50: 18.1 μm, represented by "Al$_2$O$_3$" in the table) were successively added to an aqueous Pd nitrate solution and stirred for a predetermined time. Then, to the resulting mixture was added a binder component followed by stirring to obtain a slurry having a viscosity of $2.2 \times 10^4$ cp.

To a ceramic honeycomb base material having a size of 25 mm in diameter x 30 mm in length (600 cells) and a carrier volume of 0.015 L, was applied 300 g/L of the slurry obtained as described above. After blowing away excessive slurry, the slurry on the base material was dried for 5 minutes in such a manner that hot air having a temperature of 150° C. is directly applied to the slurry-coated surface, and then the dried slurry was calcined at 600° C. for 3 hours to obtain an exhaust gas purifying catalyst (sample) for activity evaluation.

Note that the amount of the various components in the slurry were set to 60.0 parts by mass of ceria-zirconia powder, 29.5 parts by mass of La-added alumina, 10.0 parts by mass of binder, and the amount of Pd was 0.5 part by mass.

At this time, the average thickness of the catalyst layer was 112 μm.

Examples 2 and 3

An exhaust gas purifying catalyst (sample) for activity evaluation was obtained in the same manner as in Example 1 except that the D50 and the slurry viscosity of the La-added alumina powder were changed as shown in Table 1.

At this time, the average thickness of each catalyst layer was 126 μm in Example 2 and 129 μm in Example 3.

Comparative Example 1

An exhaust gas purifying catalyst (sample) for activity evaluation was obtained in the same manner as in Example 1 except that the ceria-zirconia powder in Table 1, the above La-added alumina powder, and commercially available resin particles (average particle size: 20 μm) as a burning-out material were successively added to an aqueous Pd nitrate solution.

At this time, the average thickness of the catalyst layer was 130 μm.

Comparative Example 2

An exhaust gas purifying catalyst (sample) for activity evaluation was obtained in the same manner as in Example 1 except that the above ceria-zirconia powder, the above La-added alumina powder, and commercially available resin particles (average particle size: 50 μm) as a burning-out material were successively added to an aqueous Pd nitrate solution.

At this time, the average thickness of the catalyst layer was 150 μm.

Comparative Example 3

Ceria-zirconia powder (D50: 7.9 μm, represented by "OSC" in the table) and La-added alumina powder (D50: 8.1 μm, represented by "$Al_2O_3$" in the table) were successively added to an aqueous Pd nitrate solution and stirred for a predetermined time. Then, to the resulting mixture was added a binder component followed by stirring to obtain a slurry having a viscosity of $1.7 \times 10^4$ cp.

To a ceramic honeycomb base material having a size of 25 μmm in diameter x 30 μmm in length (600 cells) and a carrier volume of 0.015 L, was applied 300 g/L of the slurry obtained as described above. After blowing away excessive slurry, the slurry on the base material was dried at 150° C. for 5 minutes using hot air drying, and then the dried slurry was calcined at 600° C. for 3 hours to obtain an exhaust gas purifying catalyst (sample) for activity evaluation.

Note that the amount of the various components in the slurry were set to 60.0 parts by mass of ceria-zirconia powder, 29.5 parts by mass of La-added alumina, 10.0 parts by mass of binder, and the amount of Pd was 0.5 part by mass.

Further, the average thickness of the catalyst layer was 101 μm.

Comparative Example 4

An exhaust gas purifying catalyst (sample) for activity evaluation was obtained in the same manner as in Example 1 except that the slurry viscosity was adjusted to $4.5 \times 10^4$ cp.

Comparative Example 5

An exhaust gas purifying catalyst (sample) for activity evaluation was obtained in the same manner as in Example 1 except that after applying the slurry to the base material and blowing away excessive slurry, the slurry on the base material was not subjected to hot air drying (quick drying).

<Purification Performance Evaluation Method>

In the L/O evaluation of a honeycomb catalyst, a simulated exhaust gas was passed through the above ceramic honeycomb catalyst at SV=200,000 $h^{-1}$. The simulated exhaust gas comprises CO, CO, $C_3H_6$, $O_2$, NO, $H_2O$, with the balance being $N_2$, assuming perfect combustion. The outlet gas components at 100 to 500° C. were measured using a CO/HC/NO analyzer (MOTOR EXHAUST GAS ANALYZER MEXA9100, manufactured by Horiba, Ltd.).

Further, in the L/O evaluation of the honeycomb catalyst, a catalyst after simulated exhaust gas durability treatment was subjected to performance comparison.

In the simulated exhaust gas durability treatment, the catalyst was set in an electric furnace held at 1,000° C. and treated for 50 hours by passing the simulated exhaust gas while circulating a mixed gas (50 s) of $C_3H_6$ or CO and $O_2$ (perfect combustion ratio) and Air (50 s).

<Image Analysis Method>

A test piece was cut from a honeycomb catalyst carrier, and the test piece was buried in a curable resin. After the resin was cured, the cross section was polished and smoothed so that the cross section of a catalyst layer and a base material could be subjected to SEM observation, and the cross section of the catalyst layer was observed using a SEM (TM3000 type Miniscope, Hitachi High-Technologies Corporation) at a magnification of 500 times.

The SEM images collected by the above method were captured into IMAGE-PRO (registered trademark) PLUS (Media Cybernetics, Inc.) and subjected to image analysis according to the following procedures.

1) A catalyst layer part to be analyzed was selected in free-form curve AOI (Area of Interest).
2) Circumference, area, and an area ratio were selected as measurement items in Count/Size (automatic measurement).
3) The color of the cell opening was selected, and a void part in the catalyst layer showing the same color was extracted.
4) A void having an area ratio of 0.05% or more was selected as an analysis object, to which the above (formula 1): $L/2/(\pi S)^{1/2}$ was applied. At this time, the void area and the void circumference at the time of analysis were used as the void cross-sectional area (S) and the void cross-sectional circumference (L), respectively.

Note that in Table 1, "Ratio [%] of voids satisfying formula 1≥2" shows the % by number of voids satisfying a condition of formula 1: $L/2/(\pi S)^{1/2} \geq 2$ among all the voids having an area ratio of 0.05% or more in the catalyst layer.

Further, "Average void radius [μm]" shows the value (μm) of the average void radius determined assuming that the void shape is a perfect circle in the void cross-sectional area in the catalyst layer.

Furthermore, "Number of voids 25 μm or more in radius" shows the number of voids each having a cross-sectional area of $1.96 \times 10^3$ μm² or more per a catalyst layer cross-sectional area of $1.0 \times 10^4$ μm².

TABLE 1

|  |  | Comparative Example 1 | Comparative Example 2 | Comparative Example 3 | Comparative Example 4 | Comparative Example 5 | Example 1 | Example 2 | Example 3 |
|---|---|---|---|---|---|---|---|---|---|
| OSC [D50 μm] | | 7.9 | 7.9 | 7.9 | 7.9 | 7.9 | 7.9 | 7.9 | 7.9 |
| Al2O3 [D50 μm] | | 8.4 | 8.4 | 8.4 | 18.1 | 18.1 | 18.1 | 28.0 | 38.2 |
| Ratio of particle size [Al2O3_D50]/[OSC_D50] | | 1.1 | 1.1 | 1.1 | 2.3 | 2.3 | 2.3 | 3.5 | 4.8 |
| Slurry viscosity [cp] | | 30,000 | 31,000 | 17,000 | 4,500 | 22,000 | 22,000 | 20,000 | 17,000 |
| Quick drying | | Included | Included | Included | Included | Not included | Included | Included | Included |
| Additives | | Resin particles | Resin particles | — | — | — | — | — | — |
| (1) Ratio [%] of voids satisfying formula: 1 ≧ 2 | | 35.9 | 48.3 | 75.3 | 69.0 | 70.0 | 64.8 | 55.6 | 53.2 |
| (2) Average void radius [μm] | | 9.6 | 15.0 | 9.8 | 8.5 | 9.7 | 12.8 | 13.4 | 14.0 |
| Number of voids 25 μm or more in radius* [pieces] | | 0.6 | 3.5 | 0.9 | 0.3 | 1.6 | 0.9 | 2.5 | 2.4 |
| Purification rate | T50 [° C.]/η 400 [%] CO | 350/73.7 | 348/74.8 | 345/74.4 | — | — | 345/75.7 | 344/76.6 | 344/77.5 |
| | HC | 356/85.3 | 356/84.9 | 351/88.2 | — | — | 350/89.3 | 350/89.7 | 350/90.0 |
| | NOx | 399/50.4 | 396/51.9 | 399/51.0 | — | — | 391/55.2 | 392/55.5 | 392/55.7 |
| | NOx Max Conv. [%] | 85.3 | 87.0 | 86.3 | — | — | 87.6 | 88.9 | 89.8 |

DISCUSSION

Since a gas hitting the uneven inner circumferential surface of voids is further diffused and mixed by setting the ratio of voids satisfying "$L/2/(\pi S)^{1/2}$"≥2 to 50% or more by number, the diffusibility and miscibility of the gas in the catalyst layer were able to be increased. As a result, η400 of CO, HC, and NOx and Max Conv. of NOx were able to be improved (Comparative Example 2 and Examples 1 to 3).

Further, particularly the purifying performance of η400 of NOx was able to be significantly improved by setting the average void diameter determined assuming a perfect circle to 10 μm or more (Comparative Example 3 and Example 1).

Further, by setting the number of voids 25 μm or more in radius to 2 or more, η-400 of CO and NOx MAX Conv. were able to be improved to 76.0% or more and 88% or more, respectively (Example 1 and Examples 2 and 3).

Furthermore, by setting the average void diameter determined assuming a perfect circle to 14 μm or more, η-400 of CO, η-400 of HC, and NOx MAX Conv. were able to be improved to 77.0% or more, 90.0% or more, and 89.0% or more, respectively (Example 2 and Example 3).

Note that the exhaust gas purifying catalysts in these examples contain only Pd as a catalytically active component, but with respect to the improvement in performance by the improvement in gas diffusibility, the same effect can be expected no matter what type of activated species is contained.

The invention claimed is:

1. An exhaust gas purifying catalyst comprising a catalyst layer comprising two or more types of inorganic porous particles each having a different particle size, a catalytically active component, and voids, wherein;

as a first characteristic, the voids satisfying a condition of the following (formula 1) occupy 50% or more by number of all the voids in the catalyst layer:

$$L/2/(\pi S)^{1/2} \geq 2 \qquad \text{(formula 1)}$$

wherein S represents a void cross-sectional area, and L represents a void cross-sectional circumference in the (formula 1), and;

as a second characteristic, in the void cross-sectional area in the catalyst layer, an average void radius, determined assuming that a void shape is a perfect circle, is 10 μm to 20 μm.

2. The exhaust gas purifying catalyst according to claim 1, wherein voids each having a cross-sectional area of $1.96 \times 10^3$ μm$^2$ or more are present in an amount of 2.0 or more per a catalyst layer cross-sectional area of $1.0 \times 10^4$ μm$^2$.

* * * * *